(12) United States Patent  
Serlie

(10) Patent No.: US 9,947,136 B2  
(45) Date of Patent: Apr. 17, 2018

(54) THREE-DIMENSIONAL IMAGE DATA ANALYSIS AND NAVIGATION

(71) Applicant: KONINKLIJKE PHILIPS N.V., Eindhoven (NL)

(72) Inventor: Iwo Willem Oscar Serlie, Noord Brabant (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 131 days.

(21) Appl. No.: 14/906,999

(22) PCT Filed: Jul. 29, 2014

(86) PCT No.: PCT/EP2014/066245  
§ 371 (c)(1),  
(2) Date: Jan. 22, 2016

(87) PCT Pub. No.: WO2015/014821  
PCT Pub. Date: Feb. 5, 2015

(65) Prior Publication Data  
US 2016/0163106 A1 Jun. 9, 2016

(30) Foreign Application Priority Data  
Aug. 1, 2013 (EP) .................................... 13178858

(51) Int. Cl.  
*G06K 9/00* (2006.01)  
*G06T 19/00* (2011.01)  
(Continued)

(52) U.S. Cl.  
CPC .......... *G06T 19/003* (2013.01); *G06K 9/2054* (2013.01); *G06K 9/4642* (2013.01);  
(Continued)

(58) Field of Classification Search  
CPC .... G06K 9/2054; G06K 9/4642; G06T 15/00; G06T 19/00; G06T 19/003;  
(Continued)

(56) References Cited

U.S. PATENT DOCUMENTS 5,305,204 A 4/1994 Ohhashi  
5,542,003 A 7/1996 Wofford  
(Continued)

OTHER PUBLICATIONS

Taosong, H. et al, "Generation of transfer functions with stochastic search techniques", Proceedings of the 7th IEEE Visualization Conference, 1996, pp. 227-234.  
(Continued)

*Primary Examiner* — Tom Y Lu

(57) ABSTRACT

A system (100) is provided for analyzing image data representing image intensities of an image volume, the image intensities having a signal dynamic range. The system (100) comprises an analysis subsystem (140) for accessing display data defining a set of display settings for display of the image volume, each one of the set of display settings causing a different sub-range of the signal dynamic range to be mapped to a display dynamic range during the display. During operation, the analysis subsystem (140) analyzes the image data to identify, for each one of the set of display settings, a region of the image volume which comprises image intensities within the respective sub-range, thereby identifying a set of regions of interest, and generating analysis data (142) identifying the set of regions of interest. As such, the user is enabled to quickly navigate to regions in the image volume which contain meaningful visual information when displayed using the respective display settings.

20 Claims, 3 Drawing Sheets

(51) Int. Cl.
  *G06T 15/00* (2011.01)
  *G06K 9/20* (2006.01)
  *G06K 9/46* (2006.01)
  *G06T 7/00* (2017.01)

(52) U.S. Cl.
  CPC ............ *G06T 7/0012* (2013.01); *G06T 15/00* (2013.01); *G06T 19/00* (2013.01); *G06T 2207/10021* (2013.01); *G06T 2207/30024* (2013.01)

(58) Field of Classification Search
  CPC . G06T 2207/10021; G06T 2207/30024; G06T 7/0012
  USPC ........................................................ 382/128
  See application file for complete search history.

(56) References Cited

U.S. PATENT DOCUMENTS

| | | | |
|---|---|---|---|
| 6,049,622 A | 4/2000 | Robb et al. | |
| 6,127,669 A | 10/2000 | Sidiropoulos et al. | |
| 7,218,763 B2* | 5/2007 | Belykh | G06T 5/007 382/128 |
| 7,283,654 B2* | 10/2007 | McLain | G06T 5/009 382/128 |
| 2004/0086175 A1* | 5/2004 | Parker | G06T 11/008 382/154 |
| 2012/0218290 A1* | 8/2012 | Waschbuesch | G09G 5/377 345/619 |
| 2013/0202170 A1* | 8/2013 | Blezek | G06T 7/162 382/131 |
| 2015/0287188 A1* | 10/2015 | Gazit | G06T 5/008 382/131 |

OTHER PUBLICATIONS

Bernardon, F.F. et al., "Interactive transfer function specification for direct volume rendering of disparate volumes", Scientific Computing and Imaging Institute, UT (2007).

Ip, C.Y. et al., "Hierarchical exploration of volumes using multilevel segmentation of the intensity-grad. Histograms", Institute for Advanced Computer Studies, 2012.

* cited by examiner

THREE-DIMENSIONAL IMAGE DATA ANALYSIS AND NAVIGATION

CROSS-REFERENCE TO PRIOR APPLICATIONS

This application is the U.S. National Phase application under 35 U.S.C. § 371 of International Application No. PCT/EP2014/066245, filed on Jul. 29, 2014, which claims the benefit of European Patent Application No. 13178858.0, filed on Aug. 1, 2013. These applications are hereby incorporated by reference herein.

FIELD OF THE INVENTION

The invention relates to a system and a method for analyzing image data of an image volume. The invention further relates to a workstation and imaging apparatus comprising the system and to a computer program product for performing the method.

BACKGROUND OF THE INVENTION

In the field of image analysis and display, it is common to enable a user to study image data by displaying different regions of the image data in response to navigation commands received from the user. For example, in medical field, Computed Tomography (CT) may provide three-dimensional (3D) image data of a patient which may show an anatomical structure. To enable a user such as a radiologist to study the anatomical structure, the 3D image data may be displayed to the user as a sequence of two-dimensional (2D) image slices of the anatomical structure in response to the user providing navigation commands.

To further support the user in the study of the image data, the user may be enabled to select between different display settings to optimize the display of the image data. In particular, the user may be enabled to select between display settings which, depending on the selection, cause a different sub-range of the dynamic range of the image data to be mapped to the dynamic range of the display. Effectively, by selecting a particular display setting, the user selects a particular sub-range of the dynamic range of the image data for display, with image intensities falling outside of said sub-range being typically mapped to the sub-range, e.g., by clipping. For example, the user may be enabled to select between different combinations of window width (WW) and window level (WL) parameters, with each combination of window width and window level parameters specifying a different conversion from the dynamic range of the image data to the dynamic range of the display. In the medical field, such display settings may be provided to enable optimal visualization of different types of body parts and body regions, such as different tissue types or different organs.

It is desirable to further facilitate a user in the study of image data. U.S. Pat. No. 6,127,669 describes a method which automatically calculates suitable window width and window level options when displaying an image. It is said that the method may automatically calculate optimal window width and window level setting for different structures of potential interest in the image, namely by applying a segmentation method to a histogram of the image. The method may further display a menu of window width and window level settings to allow the radiologist to browse through all structures of potential interest.

A problem of the method of U.S. Pat. No. 6,127,669 is that it insufficiently facilitates the user in studying the image data of an image volume.

SUMMARY OF THE INVENTION

It would be advantageous to have a system or method which further facilitates the user in studying the image data of an image volume.

To better address this concern, a first aspect of the invention provides a system for analyzing image data, the system comprising:
  an input for receiving the image data, the image data representing image intensities of an image volume, the image intensities having a signal dynamic range;
  an analysis subsystem for:
    i) accessing display data defining a set of display settings for display of the image volume, each one of the set of display settings causing a different sub-range of the signal dynamic range to be mapped to a display dynamic range during display,
    ii) analyzing the image data to identify, for each one of the set of display settings, a region of the image volume which comprises image intensities within the respective sub-range, thereby identifying a set of regions of interest; and
    iii) generating analysis data identifying the set of regions of interest.

In a further aspect of the invention, a workstation and imaging apparatus is provided comprising the system set forth.

In a further aspect of the invention, a method is provided for analyzing image data, the method comprising:
  receiving the image data, the image data representing image intensities of an image volume, the image intensities having a signal dynamic range;
  accessing display data defining a set of display settings for display of the image volume, each one of the set of display settings causing a different sub-range of the signal dynamic range to be mapped to a display dynamic range during display,
  analyzing the image data to identify, for each one of the set of display settings, a region of the image volume which comprises image intensities within the respective sub-range, thereby identifying a set of regions of interest; and
  generating analysis data identifying the set of regions of interest.

In a further aspect of the invention, a computer program product is provided comprising instructions for causing a processor system to perform the method set forth.

The above system and method facilitate the user in studying the image data of an image volume following manner. An input is provided for receiving the image data. The image data represents image intensities of an image volume in that the image data constitutes, or can be converted into, a volumetric image. For example, the image data may be constituted by a set of image slices which, when stacked together, represent the image volume. An analysis subsystem is provided for accessing display data which defines a set of different display settings for use in displaying the image volume to the user. Each one from the set of display settings, i.e., each display setting from the set of display settings, causes a different sub-range of the dynamic range of the image data to be mapped to a display dynamic range, i.e., a range which is used during display of the image volume. Effectively, the different display settings provide alternative ways of mapping the image data to the display dynamic range. As a result, image intensities outside of said sub-range are typically hard-clipped, soft-clipped or otherwise mapped to the sub-range during said display of the image volume.

The analysis subsystem is arranged for analyzing the image data to determine, for each one of the set of display settings, whether, and if so, which part of the image volume comprises image intensities within the sub-range associated with the respective display setting. Accordingly, the analysis subsystem can identify different parts of the image volume as comprising image intensities within the sub-ranges associated with the different display settings. Such parts are considered as regions of interest since they contain visual information, namely image intensities which are not clipped during the display. The analysis subsystem is further arranged for generating analysis data to identify such regions of interest, e.g., by providing pixel coordinates, voxel coordinates, image slice numbers, etc.

The above measures have the following effect. By accessing the display data, the system obtains information on different display settings which may be used during display of the image volume. In particular, the system obtains information on which sub-ranges of the signal dynamic range of the image data the user may select for display. By analyzing the image data to identify a set of regions of the image volume which comprise image intensities within the different sub-ranges, the system identifies regions which contain meaningful visual information when displayed using the respective display settings. Here, image intensities which are not clipped during display are considered to provide meaningful visual information. The regions are therefore considered regions of interest, in that the user is expected to want to study such regions. By generating analysis data to identify the set of regions of interest, this information is made available, e.g., to the user, to another part of the system or to a different system. Accordingly, the analysis data enables informing the user about the regions of interests, which enables the user to focus on the regions of interest.

The present invention is based in part on the recognition that in order to study an image volume, a user such as a radiologist typically has to scan through the image volume using different display settings. Moreover, the image volume may be large in that it may comprise, e.g., a large number of image slices. For example, in medical imaging, imaging apparatuses may simultaneously acquire 64 or more image slices. Accordingly, the user is frequently faced with a large amount of image data and a large amount of display settings. To reduce the time needed to study the image data, the user may perform a first coarse inspection to identify regions of interest for later inspection. The present invention aids in, or may even replace such a coarse first inspection in that such regions of interests are determined automatically, namely by identifying regions containing image intensities which are displayable without clipping and thus are considered to represent meaningful visual information. Advantageously, the user does not need to focus on regions which, when displayed using a selected display setting, comprise little or no meaningful visual information. Advantageously, the user more quickly study an image volume by focusing on the identified regions of interest and focusing less on other regions of the image volume. Advantageously, the cognitive burden due to studying the image data is reduced.

Optionally, the system further comprises a navigation subsystem for enabling a user to navigate through the image volume by displaying different regions of the image volume in response to navigation commands received from the user, wherein the navigation subsystem is further arranged for:
  enabling the user to select one of the set of display settings for displaying the different regions using said selected display setting; and
  visually guiding the user towards one of the set of regions of interest which is associated with the selected display setting.

The system comprises a navigation subsystem which enables the user to navigate through the image volume while the image volume is displayed using a selected display setting. The navigation system is arranged for enabling the user to select the display setting, e.g., by selecting a graphical or text representation of the display setting in an onscreen menu, pressing a key, etc. As a result, when the user navigates through the image volume, the different regions of the image volume are displayed using the selected display setting. For example, if the signal dynamic range is 12-bit, the selected display setting may cause only a particular 8-bit sub-range of the 12-bit range signal dynamic range to be mapped to the display dynamic range. Accordingly, during navigation, only image intensities within said 8-bit sub-range are displayed, whereas image intensities outside of said 8-bit sub-range are clipped. The navigation subsystem is further arranged for visually guiding the user towards a region of interest of which it has been previously determined that it comprises image intensities within the sub-range that is associated with the selected display setting. A non-limiting example is that an overview of the image volume may be displayed which shows both the current position and the position of the region of interest within the image volume. The above measures have the effect that the user is enabled to quickly navigate to regions in the image volume which contain meaningful visual information when displayed using the respective display settings. Advantageously, the user can skip or rapidly navigate through regions of the image volume which do not contain meaningful visual information.

Optionally, the navigation subsystem is arranged for visually guiding the user towards said region of interest by displaying a navigational aid which represents a navigation direction towards the region of interest. The user is thus presented with a visual representation of the navigation direction towards the region of interest. For example, the navigational aid may be an arrow, a text, etc. The above measures have the effect that the user can interpret the visual guidance of the system with a reduced cognitive burden.

Optionally, the navigation subsystem is arranged for visually guiding the user towards said region of interest by initializing the navigation to display at least part of the region of interest. The navigation subsystem thus displays at least part of the region of interest which contains meaningful visual information when displayed using the respective display settings. For example, the navigation subsystem may display said region of interest in response to the user selecting the respective display setting. The above measures have the effect that the user is presented with at least part of the region of interest, e.g., a first image slice, thereby enabling the user to quickly navigate through the entire region of interest. It is therefore not needed to manually navigate to the region of interest in the image volume.

Optionally, the navigation subsystem is arranged for determining whether the user navigates through said region of interest for enabling issuing an alert if the user fails to navigate through the region of interest. The region of interest is considered to contain meaningful visual information since it comprises image intensities which are not clipped during display. Said visual information is expected to be of relevance in the study of the image data. As such, if the user fails to navigate through the region of interest, e.g., through all image slices thereof, the study of the image data may be incomplete. Disadvantageously, in case the image data is medical image data, visual information which may be of diagnostic relevance is not seen by the user, thereby resulting in potential medical risks. By determining whether the user navigates through the region of interest, the system may issue an alert if the user fails to navigate through the image of interest, e.g., by not navigating to the region of interest, or only partially navigating through the region of interest. Advantageously, upon being alerted by the system, the user can navigate through the region of interest after all. Advantageously, such alerts may be provided in the form of a checklist for each one of the region of interest which is displayed onscreen and in which an unchecked item constitutes a visual alert that the user has not navigated through the respective region of interest.

Optionally, the navigation subsystem is arranged for recording, for each one of the set of display settings, data which is indicative of whether the user navigates through the respective region of interest. The navigation subsystem thus logs the study of the image data in that it generates data which shows whether the user navigated through the region of interests which are considered to contain meaningful visual information. Advantageously, the data enables later verifying of the completeness of the study of the image data.

Optionally, the navigation subsystem is arranged for visually identifying and/or automatically selecting one of the set of display settings for which a respective region of interest has been successfully identified. Depending upon the image data, the analysis subsystem may or may not successfully identify a region of interest for each one of the set of display settings. Here, the term successfully identified refers to a region of interest being found which comprises image intensities within the sub-range associated with the respective display setting. Accordingly, the analysis subsystem may be unsuccessful in identifying such a region of interest if the image data comprises little or no image intensities in the respective sub-range. The navigation subsystem is thus arranged for visually identifying and/or automatically selecting at least one of the set of display settings for which a respective region of interest has indeed been successfully identified. For example, if the display settings are selectable via an onscreen menu, the navigation subsystem may highlight those display settings onscreen for which a respective region of interest has been identified. Advantageously, the user can more quickly study the image data in that it is not needed to navigate through the image volume while having selected display settings for which no region of interest has been identified. Rather, the user is enabled to only use display settings in the image study for which a region of interest has been successfully identified.

Optionally, the analysis subsystem is arranged for analyzing the image data based on a histogram analysis of the image intensities. A histogram analysis is a convenient way of analyzing whether image data comprises image intensities within a sub-range of the signal dynamic range. For example, the analysis subsystem may perform a histogram analysis for different regions of the image volume, and analyze the bins of each histogram to determine whether a respective region comprises image intensities within a sub-range associated with one of the display settings and thus is considered a region of interest.

Optionally, the histogram analysis comprises determining, for each one of the set of display settings, at least one of the group of: an amount and a distribution, of the image intensities within the respective sub-range. The analysis subsystem thus not only identifies a region of interest based on whether the region of interest comprises image intensities within the respective sub-range, but also uses the amount and/or the distribution of the image intensities within a respective sub-range in said identification. Advantageously, the analysis subsystem is enabled to better identify regions which contain meaning visual information, as opposed to regions which contain only a limited amount of image intensities within the respective sub-range and/or a distribution which provides little visual information.

Optionally, each one of the set of display settings comprises a window width parameter and a window level parameter. The combination of a window width parameter and a window level parameter is frequently used to select a sub-range of a signal dynamic range for mapping to a display dynamic range during display. The analysis subsystem thus identifies regions which comprise meaningful visual information when displayed using a selected set of window width parameter and window level parameter.

Optionally, the image data is medical image data, and each one of the set of display settings is associated with visualization of a particular tissue or organ. More preferably the set of display settings include window width (WW) and window level (WL) parameters associated with the visualizations of particular tissues or organs. It is known from medical image display to use different combinations of display settings, in particular window width and window level parameters, to optimally display different tissues and/or organs. The analysis subsystem thus identifies regions which comprise meaning visual information for the study of a particular tissue or organ in the medical image data.

Optionally, the image data is constituted by a set of image slices, and the analysis subsystem is arranged for identifying a subset of the image slices as the region of the image volume. Each region of interest is thus constituted by a subset of the image slices.

It will be appreciated by those skilled in the art that two or more of the above-mentioned embodiments, implementations, and/or aspects of the invention may be combined in any way deemed useful.

Modifications and variations of the imaging apparatus, the workstation, the method, and/or the computer program product, which correspond to the described modifications and variations of the system, can be carried out by a person skilled in the art on the basis of the present description.

A person skilled in the art will appreciate that the method may be applied to multi-dimensional image data, e.g. to three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
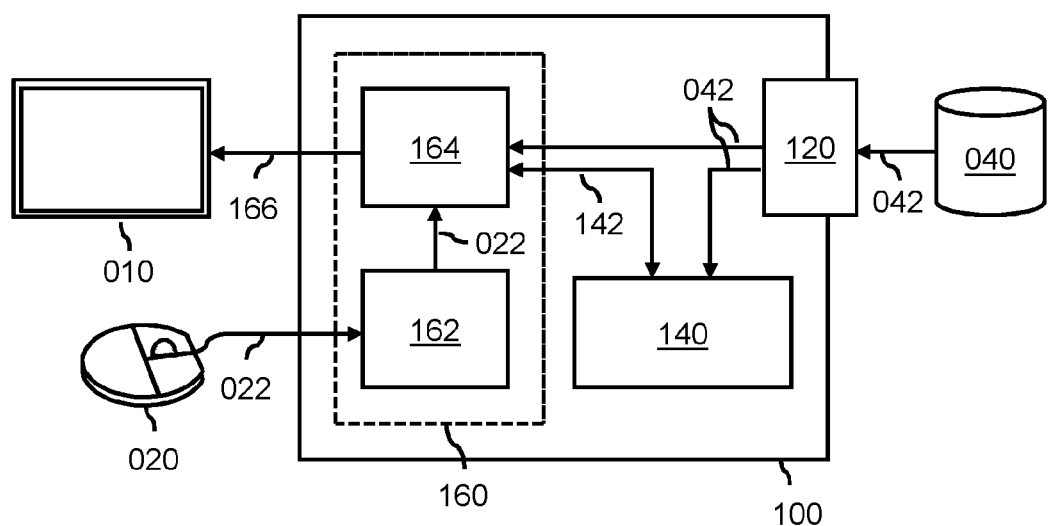
FIG. 1 shows a system for analyzing image data of an image volume to identify a region of the image volume which comprises meaningful visual information when displayed using a selected display setting and thereby constitutes a region of interest.

FIG. 1 shows a system 100 for analyzing image data. The system 100 comprises an input 120 for receiving image data 042. FIG. 1 shows the input 120 receiving the image data 042 from an image database 040, such as, in the case of medical image data, a Picture Archiving and Communication System (PACS). The image data 042 represents image intensities of an image volume. The image intensities have a signal dynamic range in that the image intensities as stored in the image data can assume values within the signal dynamic range. For example, the signal dynamic range may be 16-bit, yielding a range from 0 to 65535. The input 120 may be constituted by any suitable type of input, such as a network interface, a storage interface, etc., which is suitable for receiving the image data 042.

The system 100 further comprises an analysis subsystem 140 for accessing display data defining a set of display settings for display of the image volume. The analysis subsystem 140 may access the display data from an internal storage, i.e., from within the analysis subsystem 140. Although not shown in FIG. 1, the analysis subsystem 140 may alternatively obtain the display data from an external source such as an external database, a display processor, etc. Each one of the set of display settings cause a different sub-range of the signal dynamic range to be mapped to a display dynamic range during the display of the image volume. The analysis subsystem 140 is further arranged for analyzing the image data 042 to identify, for each one of the set of display settings, a region of the image volume which comprises image intensities within the respective sub-range. For that purpose, the analysis subsystem 140 is shown to receive or access the image data 042 via the input 120. As a result, a set of regions of interest may be identified. Furthermore, the analysis subsystem 140 is arranged for generating analysis data 142 which identifies the set of regions of interest. For example, the analysis data 142 may comprise coordinates, slice numbers, etc. FIG. 1 shows the analysis subsystem 140 outputting the analysis data 142 internally, thereby making it available for use within the system 100. Alternatively, the analysis subsystem 140 may output the analysis data 142 externally, e.g., via an output to an external device.

An operation of the system 100 may be briefly explained as follows. The input 120 receives the image data 042. Simultaneously or sequentially, the analysis subsystem 140 accesses the display data. The analysis subsystem 140 then analyzes the image data 042 to identify, for each one of the set of display settings, a region of the image volume which comprises image intensities within the respective sub-range. Finally, the analysis subsystem 140 generates the analysis data 142 which identifies the set of regions of interest.

FIG. 1 further shows an optional aspect of the present invention, namely that the system 100 further comprising a navigation subsystem 160 for enabling a user to navigate through the image volume by displaying different regions of the image volume in response to navigation commands received from the user. FIG. 1 shows the navigation subsystem 160 being comprised of a user input 162 and a display processor 164. However, this is not a limitation in that the navigation subsystem 160 may also take any other suitable form.

The user input 162 is shown to be connected to a user input device 020 such as a computer mouse, a keyboard, a touch device, etc. Accordingly, the navigation subsystem 160 is enabled to receive commands such as navigation commands 022 from the user, namely by the user operating the user input device 020. The display processor 164 is shown to receive the navigation commands 022 from the user input 162 and the image data 042 from the input 120. Accordingly, the navigation subsystem 160 is enabled to display different regions of the image volume in response to the navigation commands 022. For that purpose, the display processor 164 may make use of techniques which are known per se from the field of volumetric image visualization. For example, if the image data 042 is volumetric image data, the display processor 164 may use maximum intensity projection to generate views showing different regions of the image volume. Another example is that if the image data 042 is constituted by a stack of image slices, the display processor 164 may display different image slices in response to the navigation commands 022 received from the user. The output 166 of the display processor 164 is then displayed to the user on a display 010.

It is noted that the operation of the navigation subsystem 160, and in particular its use of the analysis data 142, will be further explained with reference to FIGS. 6a and 6b.

Figure 2:
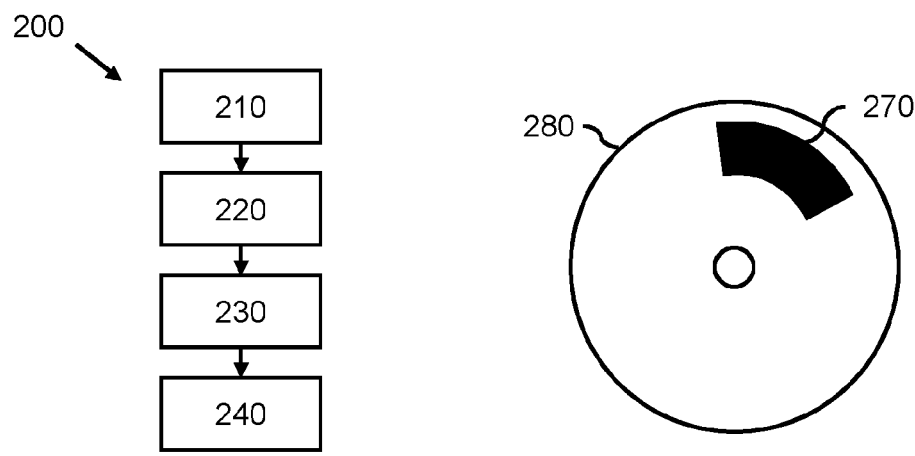
FIG. 2 shows a method for analyzing the image data of the image volume.

FIG. 2 shows a method 200 for analyzing image data of an image volume. The method 200 may correspond to an operation of the system of FIG. 1. However, this is not a limitation, in that the method 200 may also be performed in separation of the system, e.g., using a different system or device. The method 200 comprises, in a first step titled "RECEIVING IMAGE DATA", receiving 210 the image data, the image data representing image intensities of an image volume, the image intensities having a signal dynamic range. The method 200 further comprises, in a second step titled "OBTAINING DISPLAY SETTINGS", accessing 220 display data defining a set of display settings for display of the image volume, each one of the set of display settings causing a different sub-range of the signal dynamic range to be mapped to a display dynamic range during the display. The method 200 further comprises, in a third step titled "IDENTIFYING REGION(S) OF INTEREST", analyzing 230 the image data to identify, for each one of the set of display settings, a region of the image volume which comprises image intensities within the respective sub-range, thereby identifying a set of regions of interest. Finally, the method 200 comprises, in a fourth step titled "GENERATING ANALYSIS DATA", generating 240 analysis data identifying the set of regions of interest. It is noted that the steps of the method 200 may be performed in any suitable order. In particular, the first step 210 and the second step 220 may be performed simultaneously or in an reverse order than shown in FIG. 2.

Figure 3:
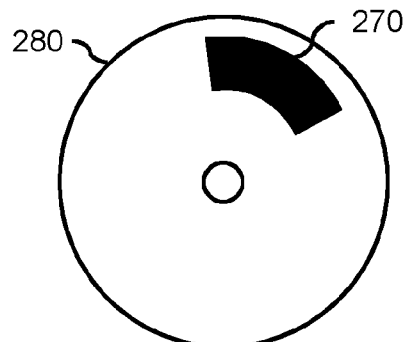
FIG. 3 shows a computer program product for performing the method.

FIG. 3 shows a computer program product 270 comprising instructions for causing a processor system to perform the aforementioned method 200 of FIG. 2. The computer program product 270 may be comprised on a computer readable medium 280, for example in the form of as a series of machine readable physical marks and/or as a series of elements having different electrical, e.g., magnetic, or optical properties or values.

Figure 4:
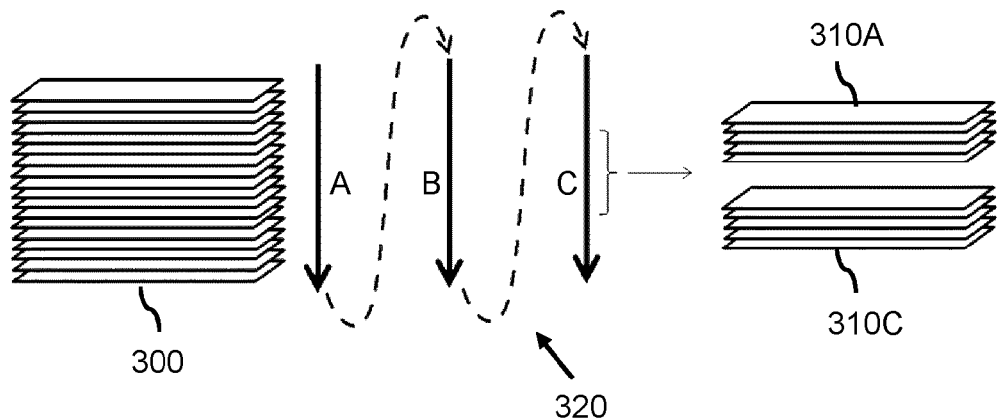
FIG. 4 shows a sequential scanning through the image volume using different display settings to identify a region of interest for each one of the different display settings.

FIG. 4 illustrates both a manner in which a user may conventionally study image data, as well as illustrates in which order the system according to the present invention may analyze the image data to identify regions of interest. In this and further examples, the image data is medical image data which is constituted by a set of image slices together representing the image volume 300, and the regions of the image volume are constituted by one or more image slices, i.e., a subset of the set of image slices. This is not a limitation, however, in that the image data 042 may also take any other suitable form, e.g., non-medical image data or image data having a different format. For example, the image data may be volumetric image data and the regions of the image volume may be sub-volumes thereof. An example of non-medical image data is that obtained during radiological testing, i.e., during industrial radiography, e.g., of a welding between two parts of a metal structure.

During the study of such medical image data, a user such as a radiologist typically performs the study in two phases, namely an anatomy inspection in which the user repeatedly scans, i.e., navigates, through all of the image slices using different display settings. Typically, the different display settings are different combinations of window width (WW) and window level parameters (WL) parameters, with each combination being associated with the visualization of a particular tissue or organ. Accordingly, during each scan, the image volume is displayed to the user using a selected WW/WL parameter combination. Alternatively, the different display settings may be different contrast and/or brightness settings, different transfer curves, etc. In particular, the different display settings may each be constituted by a look-up table (LUT) which maps the image intensities of the image data to the display dynamic range in such a way in that a meaningful display is obtained for the user. Accordingly, each LUT may select a different sub-range of the signal dynamic range for display, with other image intensities being hard- or soft-clipped.

The anatomy inspection is illustrated in FIG. 4 by the series of arrows 320, with each arrow representing a scan through the image volume using a selected WW/WL parameter combination, and the different WW/WL parameter combinations being indicated with 'A', 'B' and 'C'. Typically, the anatomy inspection is performed coarsely in that the user predominantly inspects the anatomy for regions which are to be studied more closely, i.e., regions of interest. Having completed the anatomy inspection, the user may have identified different regions of interest. In the example of FIG. 4, this is illustrated by a first subset of the image slices being identified by the user as a first region of interest 310A when using WW/WL parameter combination A and a second region of interest 310C when using WW/WL parameter combination C. It is noted that in this example, the user did not identify a region of interest when using WW/WL parameter combination B to scan through the image volume 300. Accordingly, in a detailed inspection which follows the anatomy inspection, the user may select WW/WL parameter combination A to inspect the first region of interest 310A in more detail and select WW/WL parameter combination C to inspect the second region of interest 310C in more detail. Such detailed inspection may comprise annotating pathologies in the respective image slices.

The system according to the present invention may analyze the image data to identify regions of interest in a similar order, namely by first scanning through the image volume 300 to identify a region of the image volume which comprises image intensities within a sub-range of the signal dynamic range which is associated with WW/WL parameter combination A, then scan through the image volume 300 to identify a region of interest for WW/WL parameter combination B, and finally scan through the image volume 300 to identify a region of interest for WW/WL parameter combination C. It will be appreciated, however, that the system may also analyze the image data in various other ways, e.g., by analyzing all image slices using all WW/WL parameter combinations in parallel.

It is noted that the analysis subsystem may generate the analysis data to not only identify the regions of interest, e.g., the subset of the image slices which contain meaningful visual information, but may also identify adjacent image slices, i.e., a series of image slices before and after the region of interest, thereby identifying a field of view (FOV) which provides not only meaningful visual information but also an anatomical context.

Figure 5:
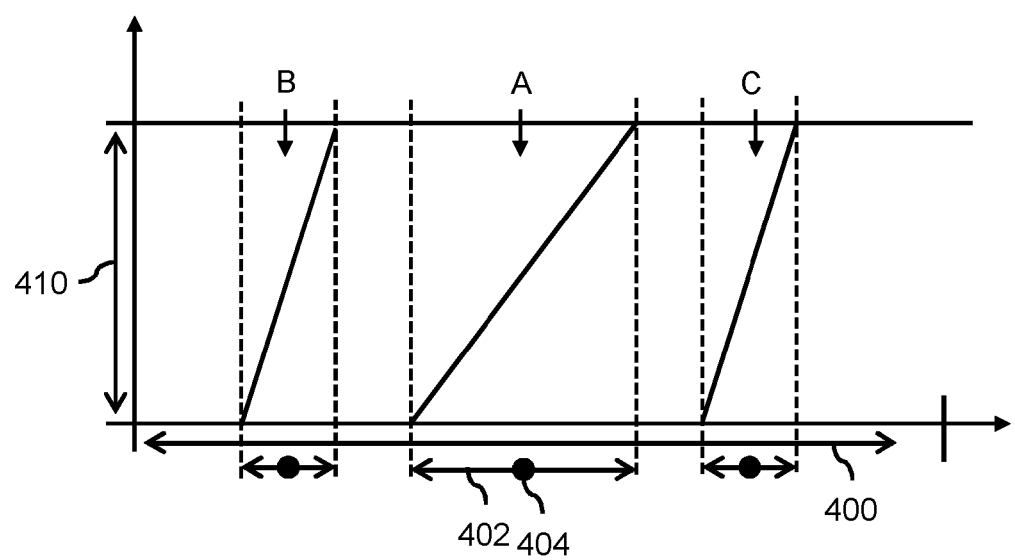
FIG. 5 shows the effect of the different display settings, namely that different sub-ranges of the signal dynamic range are mapped to the display dynamic range.

FIG. 5 illustrates the effect of the different display settings, namely that different sub-ranges of the signal dynamic range are mapped to the display dynamic range. In particular, FIG. 5 shows a graph in which the horizontal axis denotes the signal dynamic range 400 whereas the vertical axis denotes the display dynamic range 410. Frequently, the signal dynamic range is relatively high, e.g., 16 bit. In contrast, the display dynamic range may be chosen to be relatively low, e.g., 8 bit, due to the limited ability of the human eye to distinguish grey scales. As such, the display dynamic range may refer to a dynamic range chosen for display rather than the actual achievable dynamic range of the display itself, which may be higher. Accordingly, the graph of FIG. 5 illustrates different mappings from the signal dynamic range 400 to the display dynamic range which are effected by the different display settings, i.e., the different WW/WL parameter combinations A, B and C.

FIG. 5 shows the WW/WL parameter combination A as follows, namely by the double-sided arrow 402 defining a width of the sub-range of the signal dynamic range, i.e., a window width, and the dot 404 defining a level of the sub-range, i.e., a window level. Accordingly, the WW/WL parameter combination A defines a sub-range or window which is mapped to the display dynamic range 410. It is noted that such mapping may be linear but may also be non-linear, e.g., a sigmoid function or any other non-linear function. FIG. 5 further shows the sub-ranges defined by WW/WL parameter combinations B and C, which are shown to differ in level and width from WW/WL parameter combination A.

In order to identify, for each one of the set of display settings A, B, C, a region of the image volume which comprises image intensities within the respective sub-range, the analysis subsystem may be arranged for analyzing the image data based on a histogram analysis of the image intensities. It is noted that such histogram analysis is well suited for determining if, and if so, how many image intensities fall within a respective sub-range. For that purpose, histogram bins may be defined which suitably span the sub-range, e.g., a single bin spanning the entire sub-range or multiple bins together spanning the sub-range. Such histogram analysis may be performed for individual regions to determine whether each region constitutes a region of interest for a particular display setting. For example, the analysis subsystem may perform the histogram analysis for each one of the image slices individually. The histogram analysis may comprise determining, for each one of the set of display settings, an amount and/or a distribution of the image intensities within the respective sub-range. Such information may be used to better determine whether a region constitutes a region of interest when using a particular display setting, for example by only considering the region as a region of interest if it comprises a significant amount of image intensities within the respective sub-range and/or a sufficiently wide distribution within said sub-range. It is noted that the above criteria may also be applied by the analysis subsystem in separation of the histogram analysis, i.e., in general to identify a region of interest. Moreover, instead of a histogram analysis, any other suitable technique may be applied. For example, the analysis subsystem may simply compare the value of each image intensity to the respective sub-range and count the number of image intensities which fall within the respective sub-range. Such and other techniques are well within the reach of a person skilled in the art of image analysis.

Figure 6A:
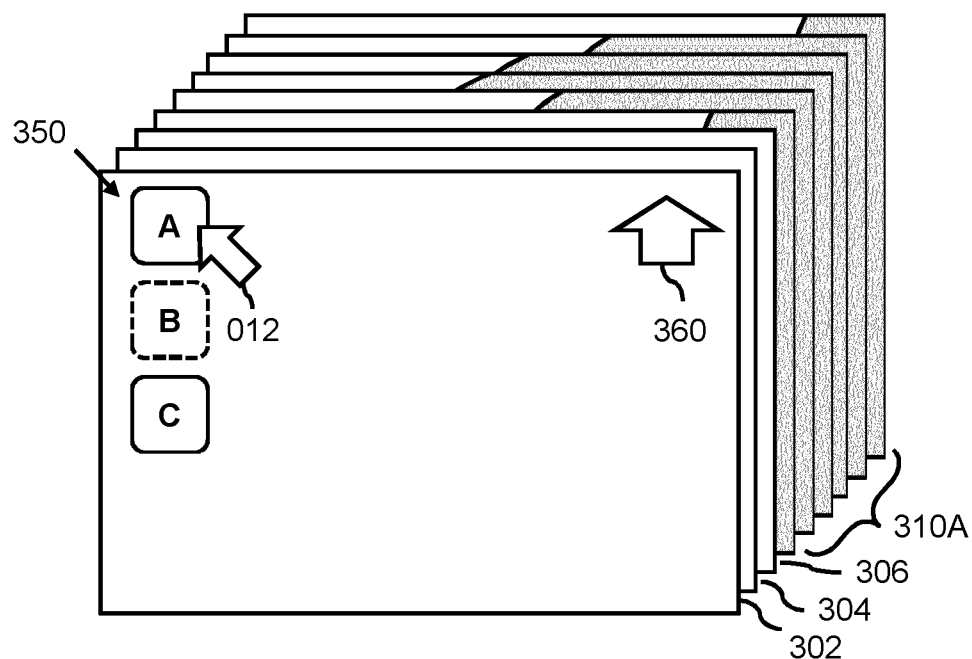
FIG. 6a shows the user navigating through the image volume having selected one of the different display settings, with the user being visually guided by the system towards a region of interest which is associated with the selected display setting.

FIG. 6a illustrates an interaction between the user and the system of FIG. 1. Firstly, FIG. 6 illustrates different image slices being shown to the user while the user navigates through the image data. Here, a first one 302 of the different image slices, i.e., a first image slice 302, is shown as an image on top of a stack of image slices, denoting that the first image slice 302 is currently shown to the user. In response to navigation commands received from the user, the navigation subsystem may display different images slices, e.g., a second image slice 304 in response to a 'forward' navigation command and again the first image slice 302 in response to a subsequent 'back' navigation command. It is noted that such functionality is known per se from the field of image display. The navigation subsystem may further be arranged for enabling the user to select one of the set of display settings 350 for displaying the different regions using the selected display setting. For that purpose, the navigation subsystem may generate a graphical representation of the display settings 350, e.g., buttons labeled 'A', B', 'C' which are selectable via an onscreen cursor 012.

In the example of FIG. 6a, the user has selected the button labeled 'A', thereby causing the navigation subsystem to display the image volume, and thus the currently displayed first image slice 302, using the WW/WL parameter combination A. It can be seen from FIG. 6a that the first image slice 302 does not contain meaningful visual information within the associated sub-range of the signal dynamic range. It will be appreciated, however, that the first image slice 302 may or may not comprise meaningful visual information when displayed using the WW/WL parameter combinations B or C.

In the example of FIG. 6a, the analysis subsystem has identified a subset of the stack of image slices as a first region of interest 310A, i.e., as comprising image intensities within the respective sub-range. The navigation subsystem may be arranged for visually guiding the user towards one of the set of regions of interest which is associated with the selected display setting. Accordingly, the navigation subsystem may visually guide the user towards the first region of interest 310A since the user has selected the WW/WL parameter combination A. For that purpose, the navigation subsystem may display a navigational aid which represents a navigation direction towards the region of interest. FIG. 6a shows, by way of example, the navigational aid being an arrow 360 pointing upward, thereby indicating a forward navigation direction towards the first region of interest 310A. Accordingly, the user is informed about which way to navigate through the stack of image slices to arrive at the first region of interest 310A. The navigational aid may also take various other forms such as text, a different graphical symbol, etc. The navigation subsystem may also provide a different way of visual guidance, e.g., by displaying an overview of the image volume which shows both the current position and the position of the region of interest within the image volume.

FIG. 6a shows a further optional aspect of the present invention, in that it shows a result of the navigation subsystem being arranged for visually identifying one of the set of display settings 350 for which a respective region of interest has been successfully identified. In the example of FIG. 6a, the navigation subsystem visually identifies both the WW/WL parameter combinations A and C as being WW/WL parameter combinations for which a respective region of interest has been successfully identified, namely by visually differentiating said WW/WL parameter combinations from WW/WL parameter combination B for which no region of interest has been identified and which button labeled 'B' is shown with a dashed outline. In particular, the buttons labeled 'A' and 'C' are visually identified amongst the set of display settings 350, namely by being shown with a continuous outline. Other means of visual highlighting are equally possible. For example, the button labeled 'B' may be entirely hidden. Additionally or alternatively, the navigation subsystem may also automatically select one of the set of display settings 350 for which a respective region of interest has been successfully identified, e.g., the WW/WL parameter combination A.

Figure 6B:
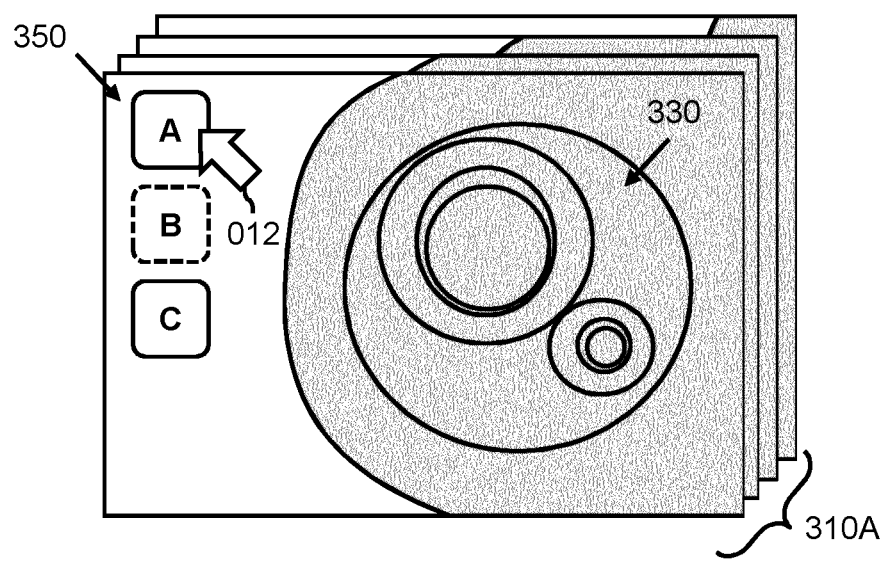
FIG. 6b shows a result of the user having navigated to the region of interest.

FIG. 6b shows a result of a navigation to the region of interest 310A, namely an image slice of the subset of image slices identified as the region of interest 310A for the WW/WL parameter combination A. It is noted that FIG. 6b schematically shows a cross-section of an organ 330 which is deemed to constitute meaningful visual content by the analysis subsystem by being comprised of image intensities within the sub-range associated with the WW/WL parameter combination A. The navigation result shown in FIG. 6b may be the result of the user navigating to the region of interest 310A, e.g., by providing a number of 'forward' navigation commands to navigate in the navigation direction indicated by navigational aid 360 of FIG. 6a. Alternatively, FIG. 6b may also be the result of the navigation subsystem being arranged for visually guiding the user towards said region of interest by initializing the navigation to display at least part of the region of interest 310A. For example, the navigation subsystem may, upon selection of the button labeled 'A' by the user, automatically navigate to the region of interest 310A, e.g., by showing one of its image slices such as a first image slice or a middle image slice. It is noted that the term initializing refers to the navigation subsystem automatically navigating to the region of interest 310A after which the user can again navigate, e.g., through the remainder of the region of interest 310A.

In general, the navigation subsystem may be arranged for determining whether the user navigates through said region of interest. For example, if the region of interest is comprised of five consecutive image slices, the navigation subsystem may determine whether the user indeed navigated through all of the five consecutive image slices. The navigation subsystem may further be arranged for issuing an alert if the user fails to navigate through the region of interest. The alert may be to alert the user, e.g., a visual or audible alert. The alert may also be silent in that it is recorded rather than provided to the user. Such recording may be for logging or other documentation purposes. Similarly, the navigation subsystem may be arranged for recording, for each one of the set of display settings, data which is indicative of whether the user navigates through the respective region of interest. Such recording may also be displayed to the user, e.g., in the form of a checklist. Alternatively, only the checklist may be displayed to the user. Another option is that the navigation subsystem may automatically invoke an image display action if it has determined that the user has navigated through a region of interest using a particular display setting. For example, the navigation subsystem may automatically select a next display setting for which a further region of interest has been identified. Additionally or alternatively, the navigation subsystem may automatically navigate to said region of interest. As such, the navigation subsystem may assist the user in navigating through all identified region of interests using the respective display settings.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for analyzing image data, comprising:
    an input circuit that receives the image data, the image data representing image intensities of an image volume comprising a plurality of images, the image intensities having a signal dynamic range;
    an analysis subsystem that:
        accesses display data defining a set of display settings for display of the image volume, each one of the set of display settings causing a different sub-range of the signal dynamic range to be mapped to a display dynamic range during the display,
        analyzes the image data to identify, for each one of the set of display settings, a region of the image volume that comprises image intensities within the respective sub-range, thereby identifying a set of regions of interest;
        generates analysis data identifying the set of regions of interest corresponding to each display setting of the set of display settings, and
    a memory circuit that stores the analysis data to facilitate subsequent access to the regions of interest in the image volume based on a user selected display setting.

2. The system according to claim 1, further comprising a navigation subsystem that enables a user to navigate through the image volume by displaying different regions of the image volume in response to navigation commands received from the user, wherein the navigation subsystem:
    enables the user to select one of the set of display settings for displaying the different regions using said selected display setting;
    retrieves the analysis data from the memory; and
    visually guides the user towards a select region of the set of regions of interest that is associated with the selected display setting, based on the analysis data.

3. The system according to claim 2, wherein the navigation subsystem visually guides the user towards the select region of interest by displaying a navigational aid which represents a navigation direction towards the region of interest.

4. The system according to claim 2, wherein the navigation subsystem visually guides the user towards the select region of interest by initializing the navigation to display at least part of the select region of interest.

5. The system according to claim 2, wherein the navigation subsystem determines whether the user navigates through each image of the select region of interest and issues an alert if the user fails to navigate through the region of interest.

6. The system according to claim 5, wherein the navigation subsystem stores, for each one of the set of display settings, data that is indicative of whether the user navigates through each image of the respective select region of interest.

7. The system according to claim 2, wherein the navigation subsystem visually identifies and/or automatically selects one of the set of display settings for which a respective region of interest has been successfully identified.

8. The system according to claim 1, wherein the analysis subsystem analyzes the image data based on a histogram analysis of the image intensities.

9. The system according to claim 8, wherein the histogram analysis comprises determining, for each one of the set of display settings, at least one of the group of: an amount and a distribution, of the image intensities within the respective sub-range.

10. The system according to claim 1, wherein the image data is medical image data, and wherein each one of the set of display settings is associated with visualization of a particular tissue or organ.

11. The system according to claim 1, wherein each one of the set of display settings comprises a window width parameter and a window level parameter.

12. The system according to claim 1, wherein the image data comprises a set of image slices, and wherein the analysis subsystem identifies a subset of the image slices as the region of the image volume.

13. A workstation or imaging apparatus comprising the system according to claim 1.

14. A method for analyzing image data, comprising:
receiving the image data, the image data representing image intensities of an image volume, the image intensities having a signal dynamic range;
accessing display data defining a set of display settings for display of the image volume, each one of the set of display settings causing a different sub-range of the signal dynamic range to be mapped to a display dynamic range during the display,
analyzing the image data to identify, for each one of the set of display settings, a region of the image volume that comprises image intensities within the respective sub-range, thereby identifying a set of regions of interest;
generating analysis data identifying the set of regions of interest corresponding to each display setting of the set of display settings; and
storing the analysis data to facilitate subsequent access to the regions of interest in the image volume based on a user-selected display setting of the set of display settings.

15. The method of claim 14, comprising:
enabling a user to select one of the set of display settings for displaying the different regions using said selected display setting;
retrieving the analysis data from the memory;
guiding the user towards a select region of the set of regions of interest that is associated with the selected display setting, based on the analysis data; and
displaying the select region.

16. A non-transitory computer readable medium comprising a program that, when executed by a processing system, causes the processing system to:
receive image data, the image data representing image intensities of an image volume, the image intensities having a signal dynamic range, the image volume including a plurality of images;
access display data defining a set of display settings for display of the image volume, each one of the set of display settings causing a different sub-range of the signal dynamic range to be mapped to a display dynamic range during the display,
analyze the image data to identify, for each one of the set of display settings, a region of the image volume that comprises image intensities within the respective sub-range, thereby identifying a set of regions of interest;
generate analysis data identifying the set of regions of interest corresponding to each display setting of the set of display settings;
store the analysis data;
receive a user selected display setting of the set of display settings;
access a select region of image volume corresponding to the selected display setting based on the stored analysis data; and
display the select region.

17. The medium of claim 16, wherein the program causes the processor to visually guide the user towards the select region of interest by displaying a navigational aid that represents a navigation direction towards the region of interest.

18. The medium of claim 16, wherein the program causes the processor to visually guide the user towards the select region of interest by initializing the navigation to display at least part of the select region of interest.

19. The medium of claim 16, wherein the program causes the processor to determine whether the user navigates through each image of the selected region of interest, and issue an alert if the user fails to navigate through the region of interest.

20. The medium of claim 16, wherein the program causes the processor to analyze the image data based on a histogram analysis of the image intensities.

* * * * *